Patented Oct. 6, 1936

2,056,832

UNITED STATES PATENT OFFICE 2,056,832

A NITROCELLULOSE COATING COMPOSITION CONTAINING BLOWN CHINA-WOOD OIL

Elmer A. Daniels, Hinsdale, and Lawrence A. Donovan, Chicago, Ill.; said Daniels assignor to said Donovan and Arthur G. Rubovits, Chicago, Ill.

No Drawing. Application January 22, 1934, Serial No. 707,780

2 Claims. (Cl. 134—79)

This invention relates to a method of treating China-wood oil and more particularly to a treatment of China-wood oil to impart to the oil the property of resisting the solvent action of alcohol on a dried film of the treated China-wood oil. This invention also relates to the use of treated China-wood oil in the manufacture of cellulose ester lacquers to produce a lacquer having excellent resistance to the solvent action of alcohol.

We have found that if China-wood oil is blown with air or other oxygen containing gas at an elevated temperature, and particularly in the presence of a relatively small percentage of a sulfur containing body, which presumably acts as a catalyst, a China-wood oil product can be obtained that possesses many properties different from raw China-wood oil or China-wood oil that has been merely heated without blowing. The China-wood oil of our invention dries more rapidly than raw China-wood oil. Furthermore, when combined with other materials in a lacquer or varnish, our China-wood oil product forms a hard, glossy film that is resistant to the solvent action of alcohol, a property that makes our product useful in the manufacture of varnishes and lacquers where alcohol proofness is desired.

The blown and heated China-wood oil of our invention may be further distinguished from heretofore known China-wood oils in that our product is compatible with the usual nitrocellulose lacquers and may be used in the manufacture of nitrocellulose lacquers containing gums or resins and the customary solvents.

It is therefore an important object of this invention to provide a method for treating China-wood oil to obtain a product having more desirable properties than raw China-wood oil.

It is a further important object of this invention to provide a China-wood oil product adapted for use in the manufacture of varnishes and lacquers to impart good alcohol proofness and water proofness to these coating materials.

It is a further important object of this invention to provide a lacquer containing our China-wood oil product.

Other and further important objects of this invention will become apparent from the following description and appended claims.

The method of our invention comprises subjecting China-wood oil, variously called China-wood oil, Chinese wood oil, and tung oil, to the action of air or oxygen at an elevated temperature for a sufficient period of time to impart to the treated China-wood oil the property of being compatible with the usual nitrocellulose lacquers. In this respect, our product differs from raw China-wood oil, since raw China-wood oil is not compatible with nitrocellulose lacquers and therefore cannot be used in their manufacture.

We have found that the treatment of raw China-wood oil to obtain the desired properties may be greatly facilitated by the addition to the oil of sulfur or some sulfur bearing compound in minor proportions. It is probable that the sulfur or sulfur compounds act as a catalyst in the oxidation of the China-wood oil during the blowing treatment at an elevated temperature, but our invention does not depend upon this theory. Either sulfur itself may be used or compounds of sulfur, or mixtures thereof, such as selenium and sulfur, or true compounds of sulfur, such as sulfur monochloride ($S_2Cl_2$) or the like. In general, the percentage of sulfur or sulfur bearing compounds used should be less than 1% by weight of the China-wood oil being treated. We have found that 1 part of sulfur to 1800 parts of China-wood oil gives satisfactory results, and that the proportion of sulfur to oil may be increased to 1 part by weight in 300 parts of oil.

In conjunction with sulfur in the treatment of China-wood oil, we have also found that it is possible to use ordinary vulcanizing accelerators in the treatment of the China-wood oil. Accelerators having also a vulcanizing action, such as tetramethyl thiuram tetrasulfide, have been satisfactorily employed.

The action of sulfur and sulfur bearing compounds appears to be that of preventing jelling of the China-wood oil under the influence of high temperatures. Ordinarily, when China-wood oil is heated to a relatively high temperature over a prolonged period, the oil increases in viscosity and finally is converted into a jell-like substance. Such a substance would be entirely unsuited for our purposes. However, when sulfur or a sulfur bearing body is introduced into the China-wood oil, either before or during the blowing treatment, the oil can be blown at an elevated temperature for a sufficient period to convert it into a product having desirable properties and without jelling the oil.

The following will serve as examples to illustrate preferred embodiments of our invention:

Example 1

1 part by weight of sulfur is added to 900 parts by weight of China-wood oil and the mixture is heated without blowing, over a period of about 20 minutes up to a temperature of 280° C. Heating is then discontinued and air is blown through the heated oil for a period of about 3 hours. The introduction of air into the oil mass causes the temperature to drop rapidly, but after the temperature has dropped to about 121° C., this temperature is maintained for the balance of the blowing period.

Example 2

1 part of sulfur is added to 600 parts by weight of China-wood oil and the mixture is heated, without blowing, over a period of about 35 minutes up to a temperature of 250° C., which temperature is maintained for 15 minutes. Air is then introduced into the oil mass and the temperature allowed to drop to about 121° C., where it is maintained for the balance of the blowing period of about 3½ hours.

The product of each of the foregoing examples properly combined in a lacquer dries slowly to a hard, glossy film that is highly resistant to the solvent action of alcohol. Owing to the improved characteristics of our product, a second film applied over a dried film of the treated China-wood oil will not cause the first film to be wrinkled.

We have found that it is also possible to add relatively high boiling liquids to the China-wood oil to prevent it from jelling, for example, such liquids as glycerine, ethylene glycol, and the like. These liquids may be added in proportions up to about 6% by weight of the oil and will satisfactorily prevent the China-wood oil from jelling under the action of heat. However, the addition of glycerine or a glycol lessens the resistance of the treated China-wood oil to the solvent action of alcohol and therefore these liquids cannot be added where alcohol proofness is desired.

As previously stated, the product of our invention may be made into a lacquer with nitrocellulose and the usual resins, gums and solvents, and the lacquer will dry to a clear, hard film, having a glossy finish that is resistant to abrasion. The following examples will serve to illustrate typical lacquer formulae prepared with a China-wood oil treated in accordance with our method:

Example 3

Nitrocellulose lacquer:

Solids— Per cent by weight
| | |
|---|---|
| 6 secs. viscosity cotton (nitrocellulose) | 25 |
| Amberol 801 | 25 |
| Our treated oil | 50 |

Solvents by volume—
| | Parts |
|---|---|
| Butyl alcohol | 2 |
| Butyl acetate | 3 |
| Toluol | 5 |

In place of Amberol No. 801, various other gums and resins, such as ester gum, dammar gum, and the like, may be employed. Various plasticizers may also be added to the lacquer, such as tricresyl phosphate, triphenyl phosphate, dibutyl phthalate, camphor, and the like.

An example of a suitable lacquer containing a plasticizer known as Paraplex 5B is as follows:

Example 4

| | Parts by weight |
|---|---|
| ½ sec. viscosity cotton (nitrocellulose) | 36 |
| Paraplex 5B | 10 |
| Amberol 801 | 32 |
| Treated China-wood oil | 24 |
| Solvents | 188 |

The product known as "Paraplex 5B" is believed to be a glycerine derivative of sebacic acid.

The solvent used in the preparation of lacquer containing our treated China-wood oil may be variously prepared. For a brushing solvent, the following formula, in which parts by weight are given, has proven satisfactory:

| | Parts |
|---|---|
| Butyl acetate | 7 |
| Xylol | 6 |
| Cellosolve (glycol mono-ethyl ether) | 5½ |
| Butyl cellosolve | 1½ |
| Turpentine | 12 |

A lacquer produced in accordance with the above formulae and containing our treated China-wood oil exhibits excellent alcohol proofness, waterproofness, flexibility, adhesiveness, clarity and toughness.

It will be understood that various temperatures and blowing periods may be employed. In general, the lower the temperature, the longer will be the time of blowing required, and conversely, the higher the temperature, the shorter the blowing period. Temperatures as high as 350° C. and as low as 70° C. have been used successfully, but preferably the blowing is carried out at temperatures between 100 and 280° C. The higher temperatures are used at the start when heating the oil with sulfur or a sulfur containing body, but preferably the heating is discontinued as soon as the blowing is started and the temperature allowed to drop, say over an hour or so, to about 120° C. and the mass maintained at that temperature during the rest of the blowing period.

To determine when the blowing period is complete, the oil is tested for its compatibility with nitrocellulose lacquers. If compatible, and its physical properties are otherwise satisfactory, the blowing of the oil is discontinued.

We are aware that numerous details of the process may be varied through a wide range without departing from the principles of this invention, and we, therefore, do not purpose limiting the patent granted hereon otherwise than necessitated by the prior art.

We claim as our invention:

1. A liquid coating composition comprising a mixture of nitrocellulose and a blown oil obtainable by blowing China-wood oil at a temperature between 100 and 280° C. in the presence of a relatively small percentage of sulphur until said China-wood oil is compatible with nitrocellulose.

2. A liquid coating composition comprising a mixture of nitrocellulose and a blown oil obtainable by blowing China-wood oil at a temperature of at least 250° C. in the presence of a relatively small percentage of sulphur until said China-wood oil is compatible with nitrocellulose, the blown oil being present in an amount at least twice the weight of the nitrocellulose.

ELMER A. DANIELS.
LAWRENCE A. DONOVAN.